United States Patent [19]
Giannetti

[11] Patent Number: 5,675,657
[45] Date of Patent: Oct. 7, 1997

[54] DEEP INSERTION INTRACANAL HEARING AIDS OR MINIATURIZED PERITYMPANUM HEARING AIDS

[75] Inventor: Vittorio Giannetti, Rome, Italy

[73] Assignee: COS.EL.GI. S.p.A., Pomezia, Italy

[21] Appl. No.: 433,306

[22] Filed: May 3, 1995

[51] Int. Cl.[6] ............................................. H04R 25/00
[52] U.S. Cl. ........................... 381/69.2; 381/68.6; 429/97
[58] Field of Search ........................ 381/68.6, 68, 69, 381/69.2, 23.1, 68.5, 68.7; 181/129, 130, 135; 429/97, 100, 96

[56] References Cited

U.S. PATENT DOCUMENTS

| | | | |
|---|---|---|---|
| Re. 26,174 | 3/1967 | Leale | 179/107 |
| 2,882,348 | 4/1959 | Erickson | 179/107 |
| 3,335,898 | 8/1967 | Eisinga, Jr. | 220/46 |
| 3,688,053 | 8/1972 | Bosch et al. | 179/107 |
| 3,974,933 | 8/1976 | Toth et al. | 220/3.8 |
| 4,069,400 | 1/1978 | Johanson et al. | 179/107 |
| 4,471,490 | 9/1984 | Bellafiere | 381/69 |
| 4,476,353 | 10/1984 | Haertl | 179/107 |
| 4,584,437 | 4/1986 | Giannetti | 179/107 |

FOREIGN PATENT DOCUMENTS 1083966  9/1967  United Kingdom .

*Primary Examiner*—Huyen D. Le
*Attorney, Agent, or Firm*—DeLio & Peterson, LLC

[57] ABSTRACT

Miniaturized hearing aid intended for a deep insertion into the auditory meatus of people who suffer from hearing problems, or "peritympanum" hearing aid, comprising a hollow body, a closure plate therefore provided with a cavity for housing the battery and with a small closing cover for said cavity operating as a movable battery holder shifting between a closed position supplying the contacts and an open position cutting the power supply of the battery, wherein the necessary thong for removing the hearing aids from the auditory meatus controls the movement of the battery holder from the closed position to the open position.

21 Claims, 8 Drawing Sheets

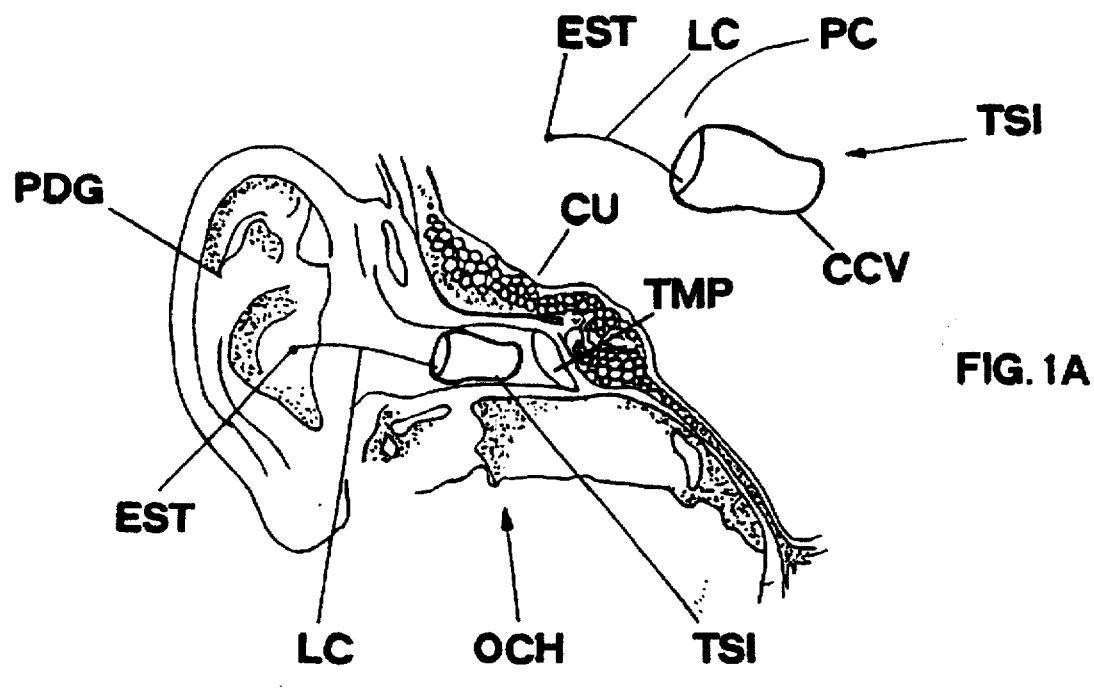
FIG. 1A
FIG. 1
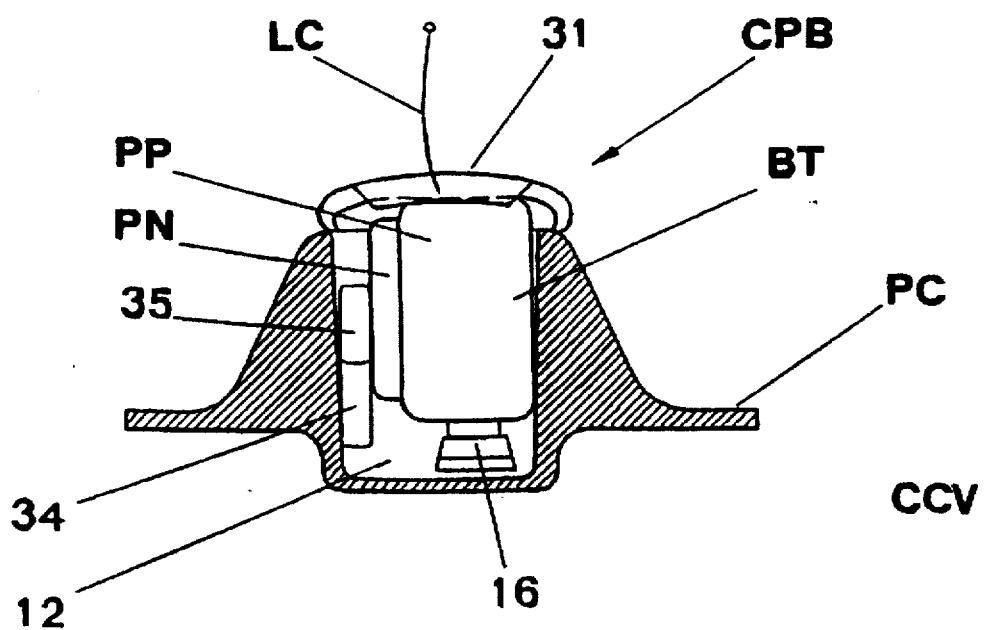
FIG. 6B

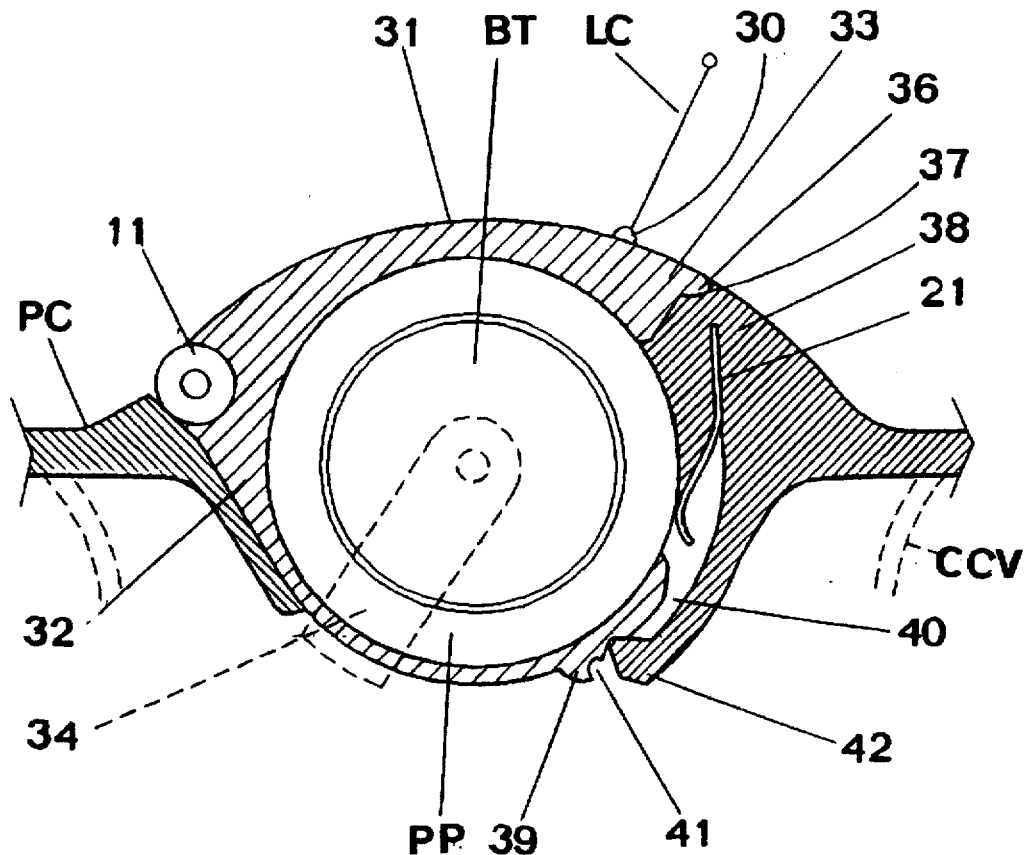
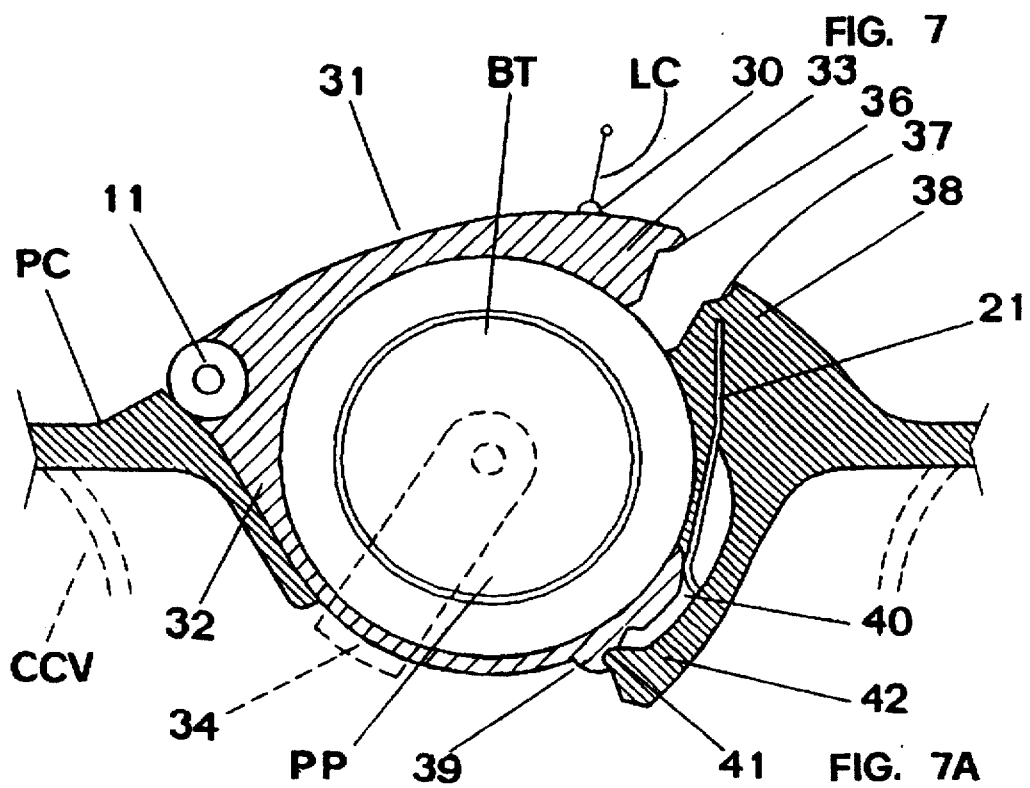
FIG. 7
FIG. 7A

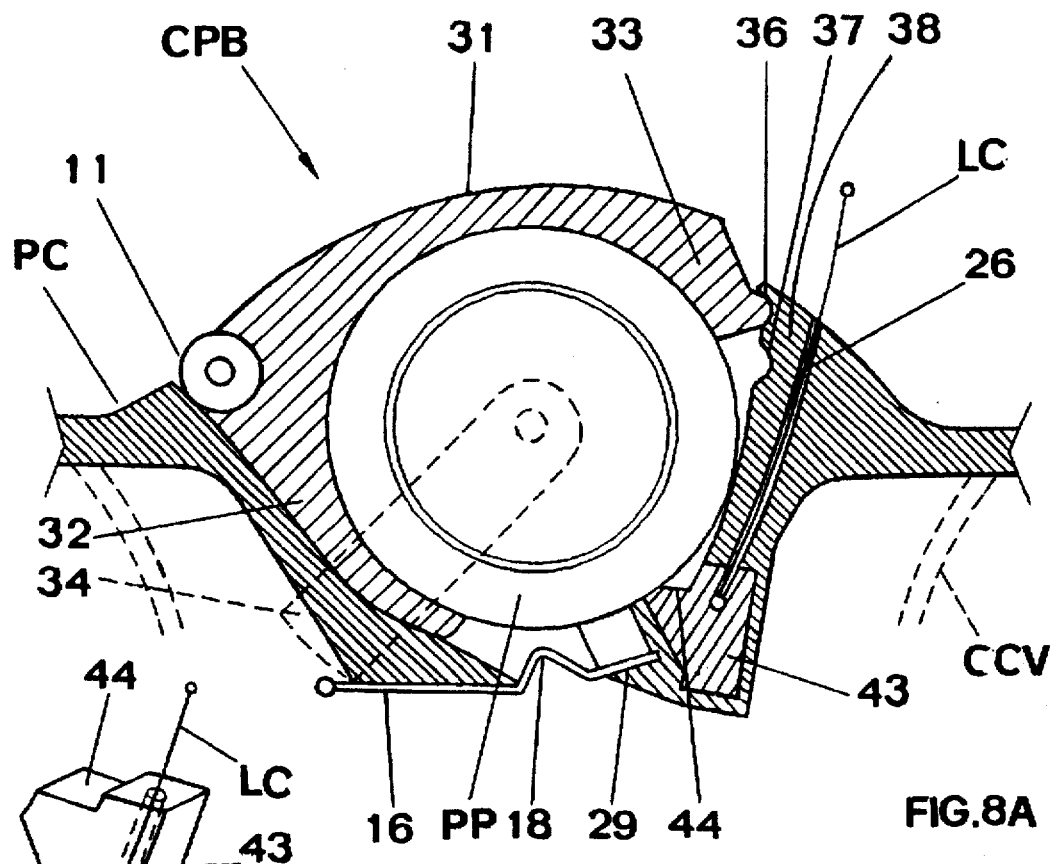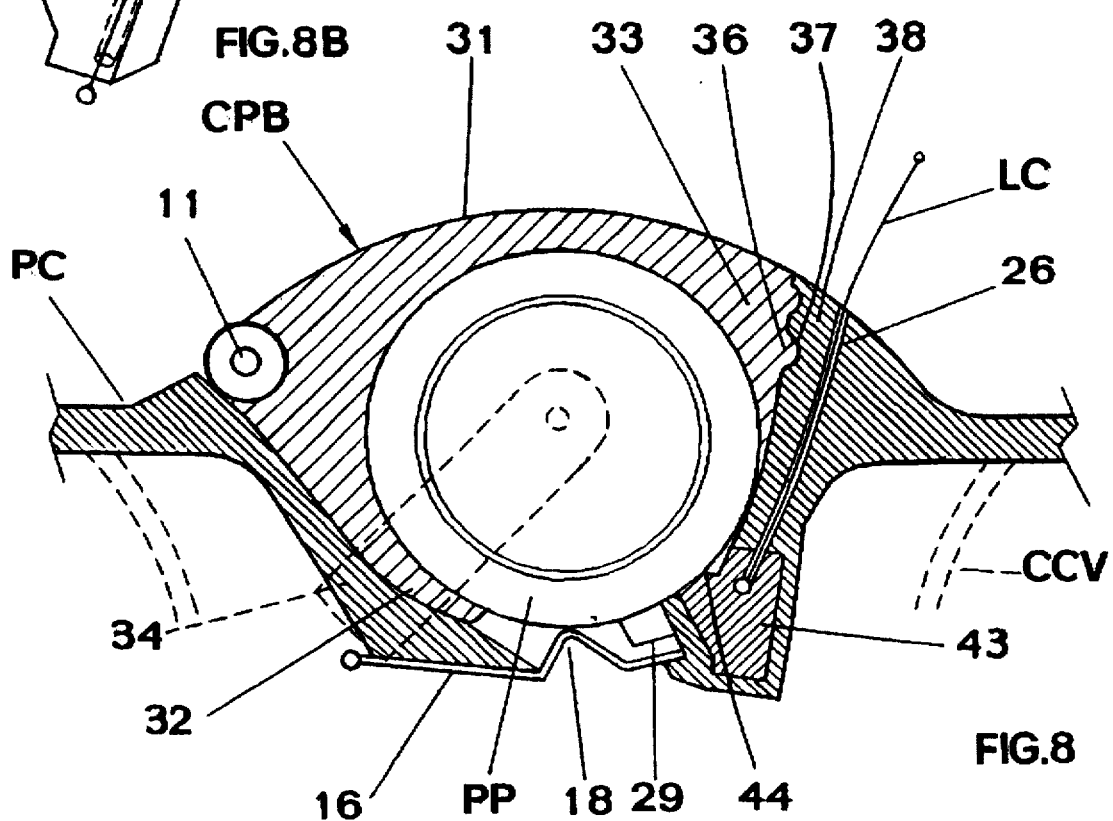

DEEP INSERTION INTRACANAL HEARING AIDS OR MINIATURIZED PERITYMPANUM HEARING AIDS

BACKGROUND OF THE INVENTION

1. Field of the Invention

This invention relates to an improvement in intracanal hearing aids, namely the hearing aids which are inserted into the auditory meatus by people who suffer from problems with the organ of hearing.

2. Description of Related Art

As it is already known by the experts in the art, in the last years hearing aid apparatuses for people with hearing problems have met with a radical transformation which regarded first the position of the apparatus. At first the apparatus was placed in a specifically made spectacles ear-piece, later it was located behind the pinna, not completely hidden from sight, and finally it was located inside the auditory meatus, in a position in which it is practically invisible.

The apparatus internal to the auditory meatus, or intracanal apparatuses, have then undergone greater and greater miniaturization tending to make them less and less visible.

The quest for invisibility has now lead to the production of the so-called "peritympanum" hearing aids, namely of miniaturized hearing aids which are so small in size as to allow their deep insertion inside the auditory meatus, whereby the inner extremity of the apparatus is at a distance of about 5-7 mm from the tympanum, while the most external side or closure plate is completely hidden behind the tragus, namely the triangular cartilaginous prominence which is part of the pinna.

Because of the extremely small size and the deepness of insertion of the hearing aid inside the auditory meatus, there has arisen the necessity to provide the hearing aid with an element whose end is located outside of the meatus and inside the pinna, and that can be gripped with the fingers.

Indeed, the miniaturized hearing aids at present available are provided with a "thong" fastened thereto whose extremity, which is external to the auditory meatus, can be easily gripped with the fingers in order to take the apparatus out of the meatus. This solution permits the removal operation perfectly, but does not solve the problem of the switching off and switching on of the apparatus "in loco". At present it is necessary to take the hearing aid out of the auditory meatus in order to switch it off, which is obviously troublesome and not convenient at all.

SUMMARY OF THE INVENTION

This invention therefore aims to provide a "peritympanum" hearing aid, or deep insertion intracanal miniaturized hearing aid, in which the removal "thong" controls a switch specially constructed and integrated with the battery holder, which, once pulled, can put the hearing aid in the OFF position; while the ON position is reached again by exerting a light pressure on the outer extremity of the hearing aid in order to push back the battery holder into the totally closed position, which is the position "hearing aid ON".

The invention comprises various embodiments, all having in common the characteristic of the movable battery holder which, being connected with the removal thong, integrates the structure and function of the switch.

Another relevant feature is that the battery holder can be structured in different shapes so as to house the battery in a "flat" position, namely generally on a plane which is parallel to the closure plate, or in a "vertical" position, namely on a plane which is perpendicular to this plate.

Finally, since the tolerance admitted for the maximum diameter of the battery, as provided by the IEC (International Electronic Committee) directions, is of about 0.3 mm, and therefore rather large with regard to the average diameter of the batteries employed in the miniaturized hearing aids, which diameter is of about 5.5 mm, in order to avoid the battery slipping out of the small cover, it would be necessary to shape the seat in which the batter is housed in such a way that it could "embrace" or encircle the battery. Such a shape, on the other hand, would involve an unduly large increase in the thickness of the small cover and so an undesirable increase in the external dimensions of the apparatus.

In order to solve this problem, according to this invention, it has been devised to fix to the "ceiling" or inside surface of the small cover a small permanent magnet in the form of a thin plate, preferably disk-shaped, which can hold the battery which it is in contact therewith, to prevent it from failing out and down when the small cover of the hearing aid is completely open.

Besides, the cooperating elements that, together with the battery holder, allow to achieve the object of the invention, can have different shapes, movements and actions.

In summary, the present invention is directed to a miniaturized hearing aid intended for a deep insertion into the auditory meatus of people who suffer from hearing problems, or "peritympanum" hearing aid, comprising a hollow body, a closure plate therefore provided with a cavity for housing the battery and with a small closing cover for said cavity operating as a movable battery holder shifting between a closed position supplying the contacts and an open position cutting the power supply of the battery, wherein the necessary thong for removing the hearing aids from the auditory meatus controls the movement of the battery holder from the closed position to the open position.

In the preferred embodiment, the improved miniaturized hearing aid comprises a hollow body; a closure plate for said body having a cavity for housing a battery having two poles to supply power to operative circuits of the hearing aid; and a closing cover for said cavity having locking means cooperating with matching means housed in said cavity for locking the cavity in the closed position. The closing cover is hinged so as to pivot and rotate toward and away from said cavity and is shaped so as to house said battery so that said battery moves together with said cover. The miniaturized hearing aid further has a removal thong with an inner end fastened thereto and having the free end in the pinna of the ear of said person. First and second electrical contacts are provided for the two poles of said battery. Each contact is disposed in said cavity so as to be in electrical contact with the respective battery pole when said cover is in the closed position. The cover is openable by disengagement of said locking means and separation of one of the battery poles from the respective contact so as to cut the power supply to said operative circuits and place the hearing aid in the OFF position. The inner end of said thong is fastened to the hearing aid in such a way that pulling on said thong opens said cover and switches off the hearing aid.

More preferably, the first of said contacts (16) biases said battery upwardly so as to cause said cover to open when said locking means are disengaged and cause said second contact to detach from the respective pole of said battery.

In one embodiment, the inner end of said thong is fastened to said cover. The thong may be movable inside a passage formed in said closure plate and said thong inner end may be fastened to the second of said contacts, disposed under said battery, so that pulling on said thong lifts the same contact biasing said battery upward to the cover open position thereby causing the disengagement of the means that maintains said cover in the closed position and opening the cover.

In another embodiment, the inner end of said thong is fastened to a sliding element moving in said cavity, under said battery, between a non-operative position and a position wherein said sliding element, pulled by said thong, biases said battery towards the opening position of said small battery holder cover.

The cover may holds said battery in a position essentially parallel to said closure plate or essentially in a plane containing the longitudinal axis of said hollow body.

The cover may hold a permanent magnet, in the form of a plate fastened to its inner side, for holding the battery and preventing the accidental removal of the battery when the cover is completely open.

The cover may also be provided with an insulating material element that, in the cover open position, is movable between one of the poles of said battery and the relative contact causing the interruption of the power supply to said operative circuits of said miniaturized hearing aid thereby placing the hearing aid in the OFF position.

BRIEF DESCRIPTION OF THE DRAWINGS

The invention will now be described in full detail with reference to the annexed drawings, wherein, merely for an exemplificative and absolutely not restrictive purpose, the most representative embodiments thereof will be illustrated. More precisely:

FIG. 1 is a rather schematic view representing a cutaway of an ear and relative auditory meatus wherein it has been inserted a "peritympanum" or miniaturized hearing aid of the kind this invention refers to;

FIG. 1A shows the only hearing aid;

FIG. 6B is a rather schematic section of the embodiment shown in FIG. 6 as taken at 90° with regard to this section;

FIG. 7 is a section of an embodiment similar to the one shown in FIG. 6, with the battery holder in the "ON" position;

FIG. 7A is a section of the same embodiment as the one shown in FIG. 7, with the battery holder in the "OFF" position;

FIG. 8 is a section of still another embodiment of a battery holder of the kind shown in FIG. 6, in the "ON" position;

FIG. 8A is a similar section of still another embodiment of FIG. 8 in the "OFF" position;

FIG. 8B is a detailed perspective view, on a larger scale, showing the element of actuation of the battery holder shown in FIGS. 8 and 8A;

DESCRIPTION OF THE PREFERRED EMBODIMENT(S)

Before starting with the detailed description of the various figures, it should be noted that in all of these figures the small movable battery holder cover will always be indicated with the reference CPB, and that all the elements which are identical and already known by the previous art or not determining to the purpose of this invention, like, for example, axes of rotation, polarities and the like, will always be indicated with the same numbers or groups of letters. The reference numbers will indicate the various nonaccessory and most relevant components, with regard to the purpose of the invention.

With reference to FIGS. 1 and 1A, miniaturized hearing aid TSI which this invention refers to, also called a "peritympanum" hearing aid owing to the extreme closeness of its inner extremity to tympanum TMP of ear OCH, is illustrated as inserted inside auditory meatus CU of ear OCH with end EST of thong LC accessible in pinna PDG of ear OCH. Thong, LC in the miniaturized hearing aids presently available, is utilized only for removing the hearing aid from auditory meatus CU.

Miniaturized hearing aid TSI comprises a generally cone-shaped hollow body CCV and a closure faceplate PC wherein, as one can see in all the drawings from 2 to 9A, a small cover has been mounted which rotates around an axis lying on the same plane as the faceplate.

It should be noted that in all the embodiments of the invention, the switching off of the apparatus, namely the action needed to put the apparatus in the "OFF" position, is achieved by means of a rotation of small battery holder cover CPB with respect to the closure plate PC from the closed position (apparatus ON) to the half open position (apparatus OFF), in which position small cover CPB causes the detachment of one of the poles of battery BT from the relative contact.

In the embodiments of FIGS. 2, 3, 4 and 5, battery BT is "housed" in a small battery holder cover CPB whose principal plane is essentially parallel to the plane of closure plate PC. Body 10 of the battery holder is hinged on same plate PC by means of a pin 11 in such a way as to be able to rotate with respect to a cavity 12 formed therein.

For a greater security, as we have already mentioned in the premise, inside battery holder CPB of each embodiment considered there has been fixed a small permanent magnet very reduced in thickness, which is referred to by 45.

Figure 2:
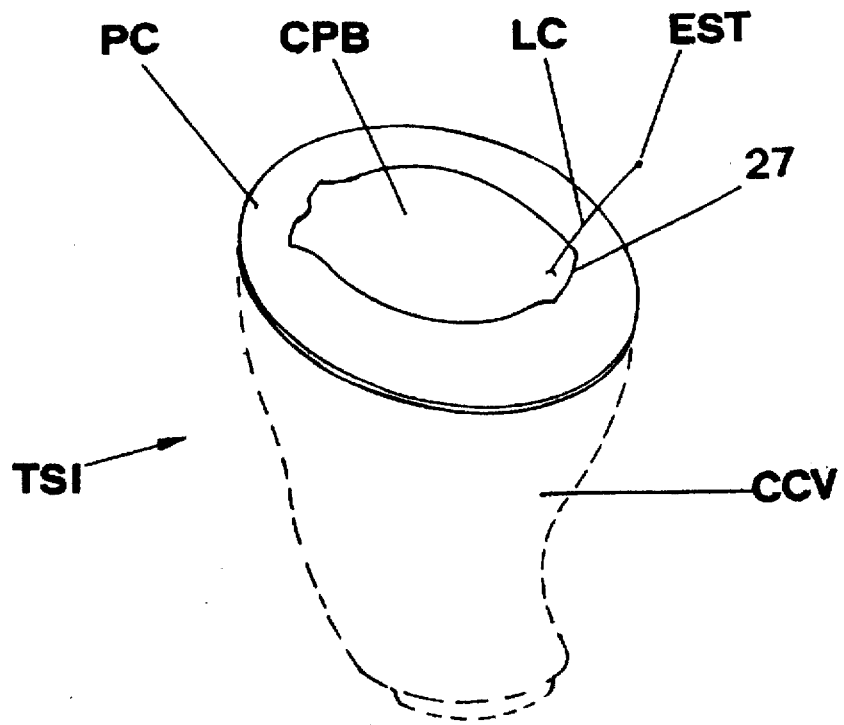
FIG. 2 is a perspective view of the miniaturized hearing aid with the battery holder cover in the "ON" position.
Figure 3:
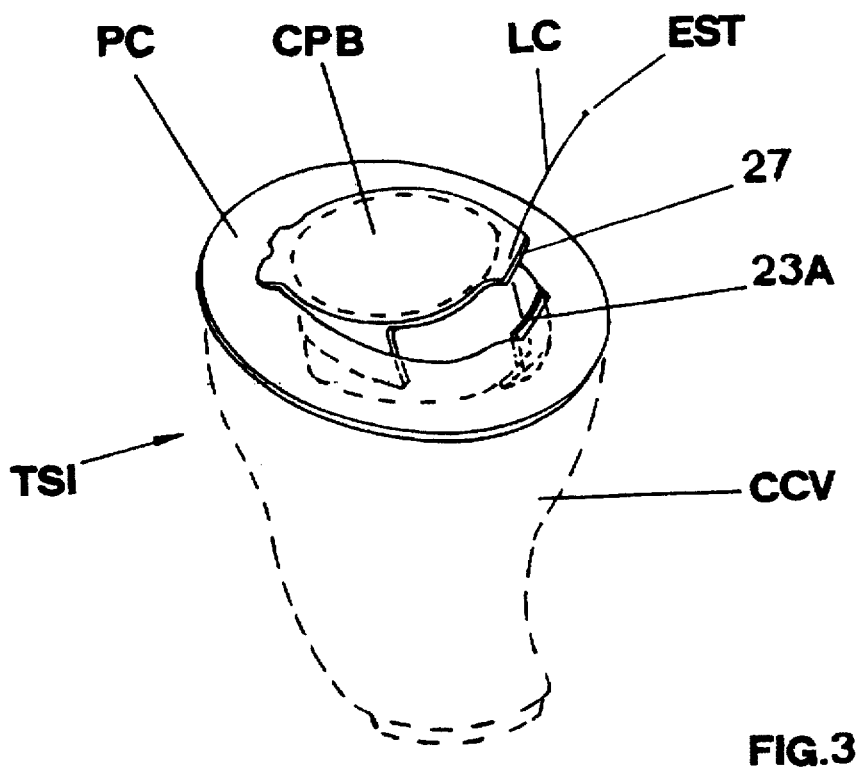
FIG. 3 is a similar perspective view of the miniaturized hearing aid with the battery holder cover in the "OFF" position.
Figure 4:
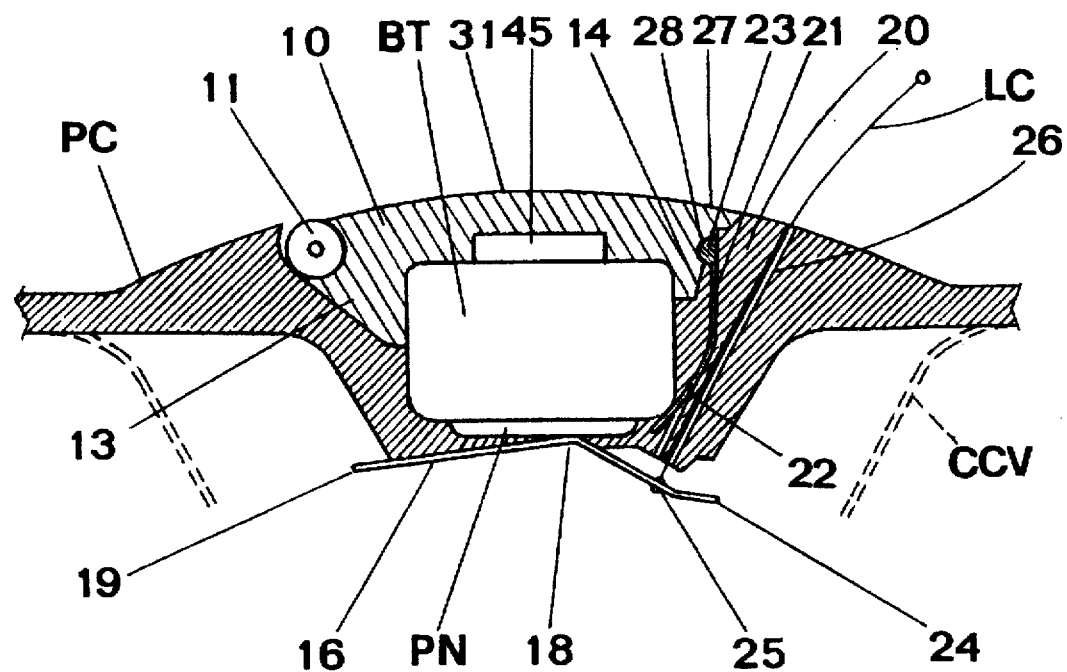
FIG. 4 shows a section of the first embodiment of the invention provided with a battery holder of the "flat" battery kind in the "ON" position.

In the embodiment in FIG. 4, battery BT is held inside battery holder CPB between a heel 13 created under pin 11 and a front bracket 14 protecting from the disk which constitutes the closure part of cavity 12.

Figure 4B:
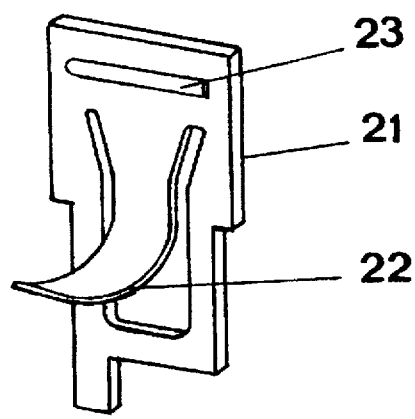
FIG. 4B is a perspective on a larger scale of a contact for the battery of the embodiment shown in FIG. 4.

In the lower part of cavity 12 a plate 16 is inserted and provided with a cusp 18, the back of which is inserted and fixed inside the thickness of back wall 19 of cavity 12. In the thickness of front wall 20 of this cavity a second plate 21 is inserted provided with a central J-shaped tongue 22. As shown in FIG. 4B, tongue 22 protrudes inside cavity 12 under the ring which constitutes positive pole PP of battery BT in such a way as to be into contact therewith.

Plate 21 is embedded in the casting of closure plate PC by means of its upper portion on which a small ledge 23 protruding in cavity 12 has also been created.

Free extremity 24 of plate 16 is provided with a hole to which lower end 25 of thong LC is fastened. Thong LC extends out of closure plate PC through a passage 26 created in the casting. Finally, on cover bracket 14, under stop protrusion 27, a notch 28 is formed, the shape and dimensions of which are complementary to those of ledge 23.

Figure 4A:
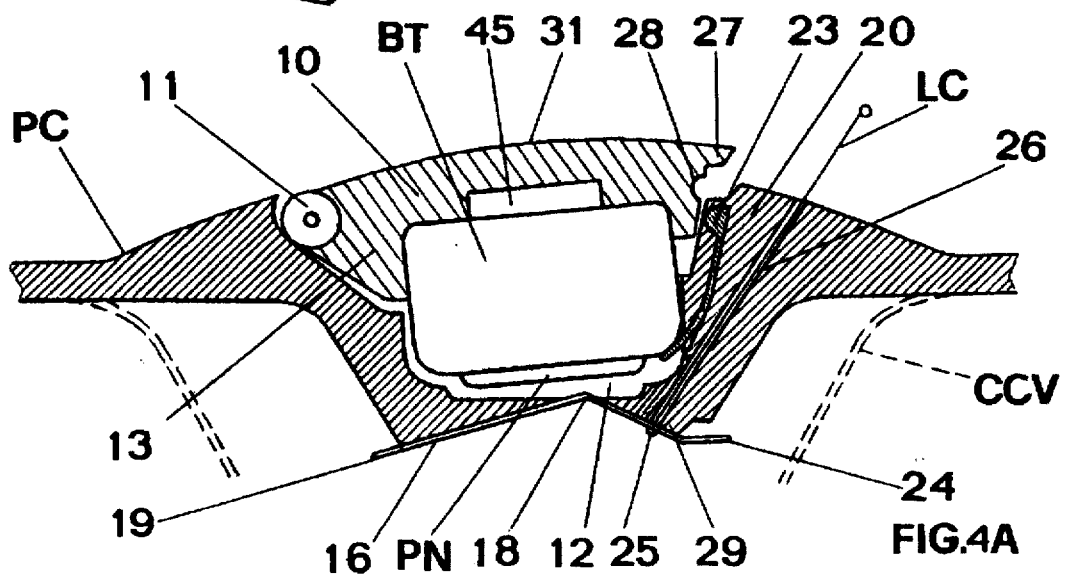
FIG. 4A is a similar section of the first embodiment of the invention in the "OFF" position.

With all its parts so constructed and arranged, the operation of the apparatus is as follows:

In the apparatus "ON" position as shown in FIG. 4 ledge 23 is engaged with notch 28 in such a way as to oppose the upward opening pressure exerted by resilient tongue 22 on positive pole PP of battery BT. Battery BT in turn transmits upward opening pressure to small battery holder cover CPB. Whenever the user decides to switch off the apparatus it will be sufficient only to pull on thong LC. The resulting stronger upward pressure is then transmitted by cusp 18 and tongue 22 to battery BT, and therefore to small cover CPB, to force ledge 23 to disengage from notch 28, thus allowing the lifting of the battery BT up to the position shown in FIG. 4A.

As shown, in this position negative pole PN of battery BT is detached from contact 16, which can not lift further because its extremity 24 hits against a step-like stop 29 crated in the casting of closure plate PC.

Figure 5:
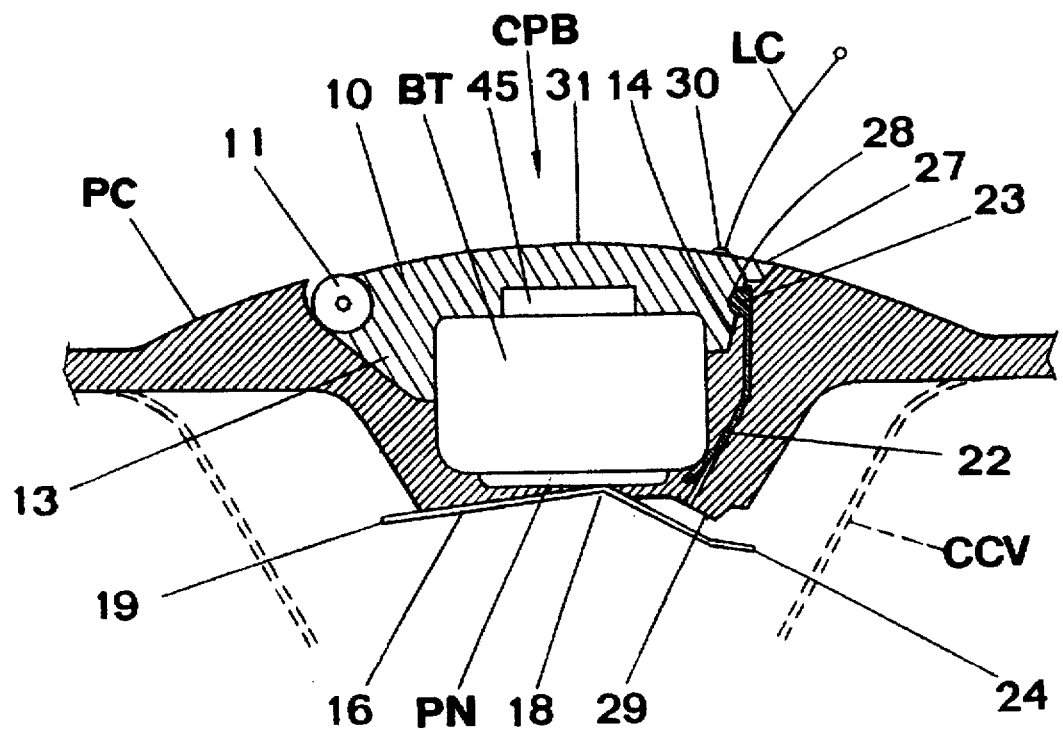
FIG. 5 is a similar section of a second embodiment provided with a battery holder of the same kind in the "ON" position.

In FIG. 5 a different embodiment of the invention is shown, also with a battery BT placed in a flat position inside the apparatus.

Figure 5A:
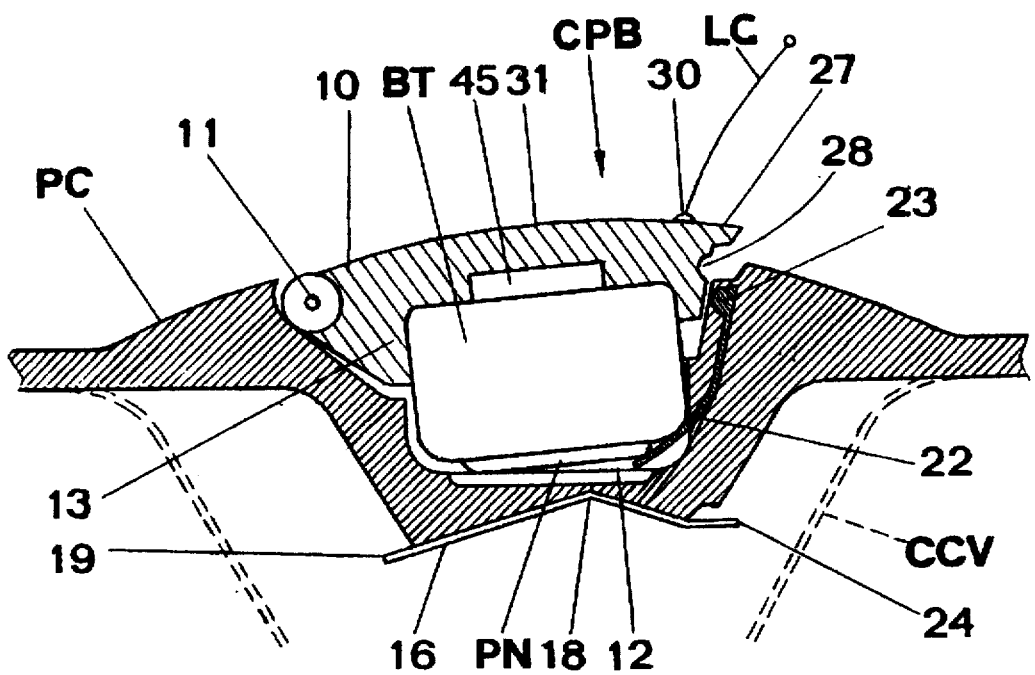
FIG. 5A is a similar section of the second embodiment in the "OFF" position.

This embodiment is similar to the one shown in FIG. 4, the only difference being that the inner end of thong LC is fastened directly to small battery holder cover CPB in 30, so that in the casting of the apparatus it is not necessary to create passage 26, which is therefore omitted. Since the shape and operation of the various constituent parts (indicated with identical reference numbers) are absolutely identical, their operation will not be here further described. As is easily understood in this embodiment, FIG. 5 represents the "ON" position, while FIG. 5A represents the "OFF" position of the hearing aid.

As it will have been easily understood, the operation of above mentioned magnetic plate 45 is essential in that it prevents battery BT from coming out of small cover CPB, and its possible falling down and out of the apparatus and consequent loss thereof, even with small cover CPB in the full open position.

With reference to FIGS. 6 to 9A, different embodiments of the invention will now be described, wherein small battery holder cover CPB has been structured and shaped in such a way so as to house battery BT on a plane containing the axis of hollow body CCV. In all these embodiments, small battery holder cover CPB, hinged on the closure plate PC in such a way as to make angular movements thereto in a plane which is perpendicular to this plate, will comprise a seat shaped as an open ring provided with a locking rim 36, wherein battery BT is inserted laterally.

Figure 6:
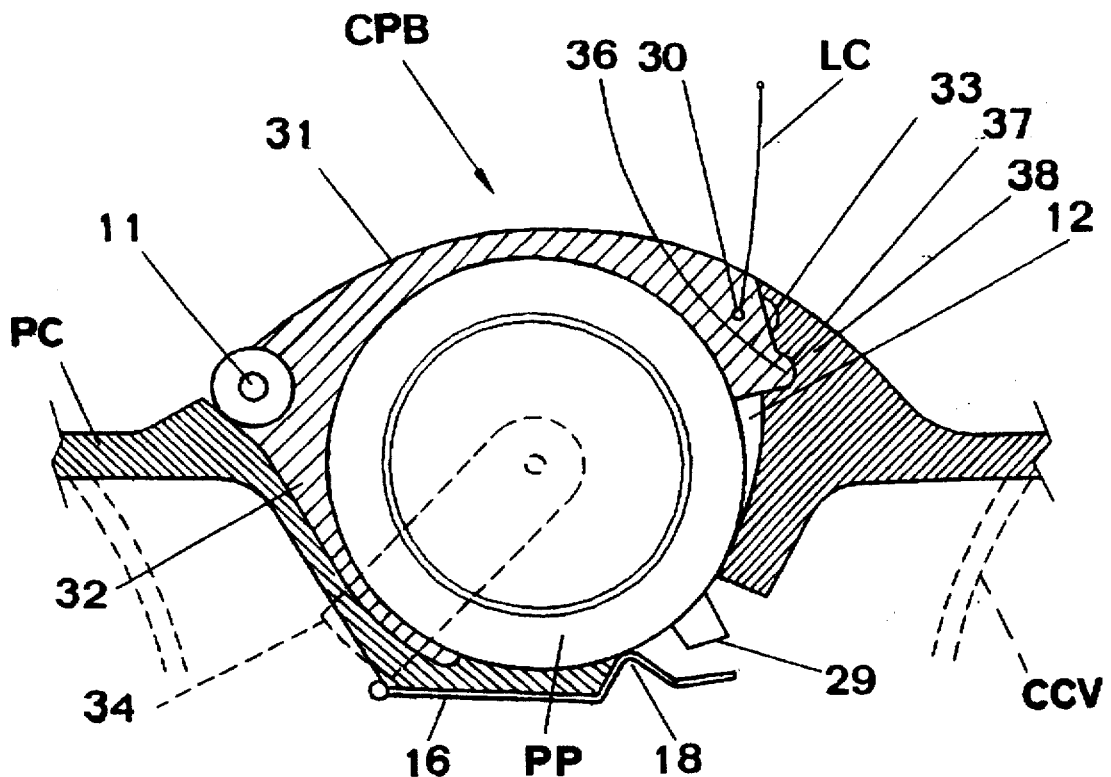
FIG. 6 shows a section of an embodiment of the invention provided with a battery holder of the kind wherein the battery is placed perpendicular to the plane of the closure plate, in the "ON" position.
Figure 6A:
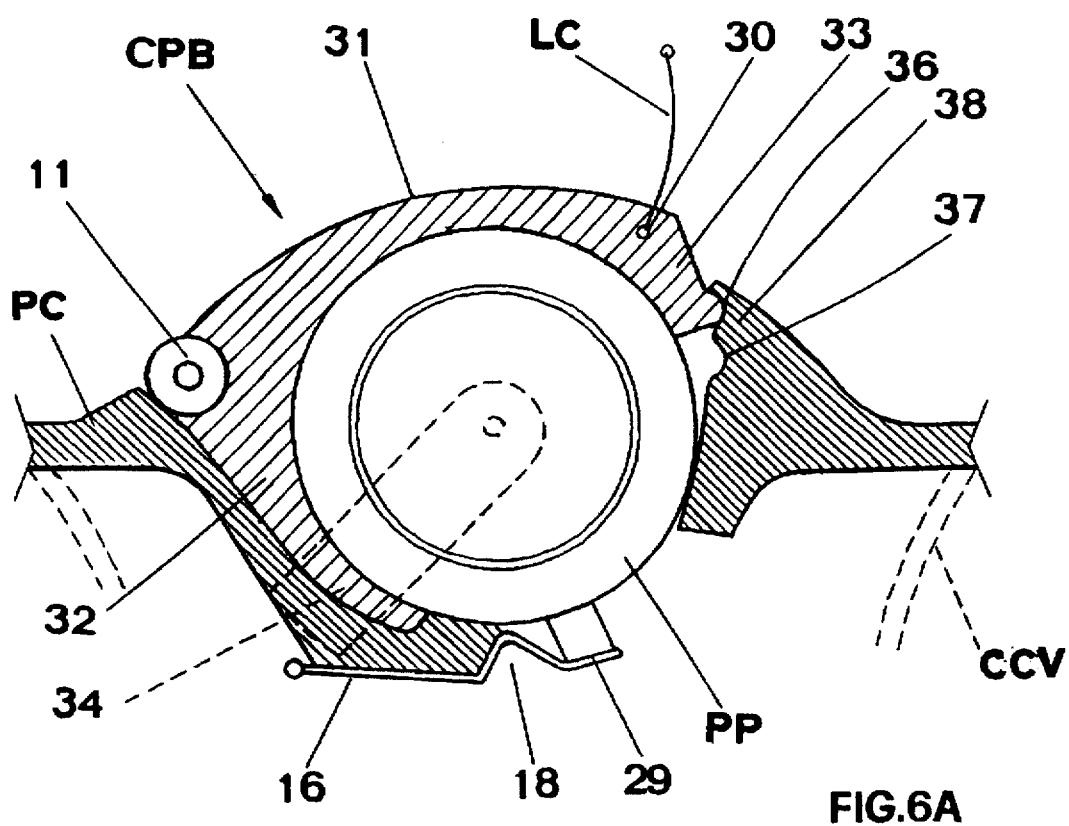
FIG. 6A is a similar section of the embodiment shown in FIG. 6 in the "OFF" position.

Referring now to FIGS. 6 and 6A, it can be seen that small battery holder cover CPB, hinged on closure plate PC by means of pin 11, comprises a top 31 external to closure plate PC and an open-ring-shaped element integral therewith and housed in cavity 12 of closure plate PC.

The open-ring-shaped seat, by means of its lower inner portion 32 and upper outer portion 33, embraces only a portion of battery BT, leaving free a good portion of positive pole PP on the lower side. In this way, similar to operation in connection with negative pole PN in the embodiments shown in FIGS. 4 and 5, positive pole PP contacts plate 16, which is embedded in the casting of closure CPB is in the closed position illustrated in FIG. 6. As shown the necessary contact with negative pole PN occurs by means of radial plate contact 34 adjacent to side wall 35 of cavity 12 (FIG. 6B). Both positive and negative contacts are connected with the inner circuits of the apparatus housed in hollow body CCV.

The operation of this embodiment is analogous to the operation of the embodiment shown in FIG. 4. Rim 36 integral with part 33 engages with a notch 37 formed in a corresponding portion on front side 38 of closure plate PC. Pulling on thong LC, whose inner end is fastened to small battery holder cover CPB in 30 will cause the disengagement of the two elements 36, 37 and the lifting of the battery from plate 16 with a consequent cut in the power supply to the inner circuits (not shown) which, as previously mentioned, are electrically connected with contact plates 16 and 34.

In the embodiment shown in FIG. 7, ring 32 is more complete and extends almost completely around positive pole PP of battery BT. Ring 32 is provided with an extension 39 which extends upwards and includes a wedge-shaped end 40 and a lower notch 41. In this embodiment the contact with positive pole PP of battery BT is obtained by means of a resilient curved plate 21, the lower end of which is biased by its own shape against this pole in the closed-over position. By pulling thong LC, small cover CPB lifts bodily, and accordingly the wedge-shaped extension 40, which is made of an electrically insulating plastic material, slides between positive pole PP and plate 21, and the contact between the two elements PP, 21 is cut (apparatus OFF). The upward motion of battery BT and cover CPB is limited by the engagement of resilient tooth 42, integral with closure plate PC, in notch 41 (FIG. 7A).

The embodiment of FIGS. 8 and 8A is similar to the embodiment of FIGS. 6 and 6A, the only difference being that thong LC is not fastened to top 31 of small battery holder cover CPB, but it is fixed to a sliding element 43 provided with a tooth 44 located inside cavity 12 of closure plate PC. In this embodiment thong LC will move inside a passage 26 formed in the casting of closure plate PC. The sliding element is shown in the detail of FIG. 8B.

By pulling thong LC (FIG. 8), tooth 44 pushes battery BT upward, with the consequent disengagement of rim 36 from notch 37 of small cover CPB, whereupon battery BT can lift and move off plate 16, the end of which stops against stop 29, in the OFF position shown in FIG. 8A.

Figure 9:
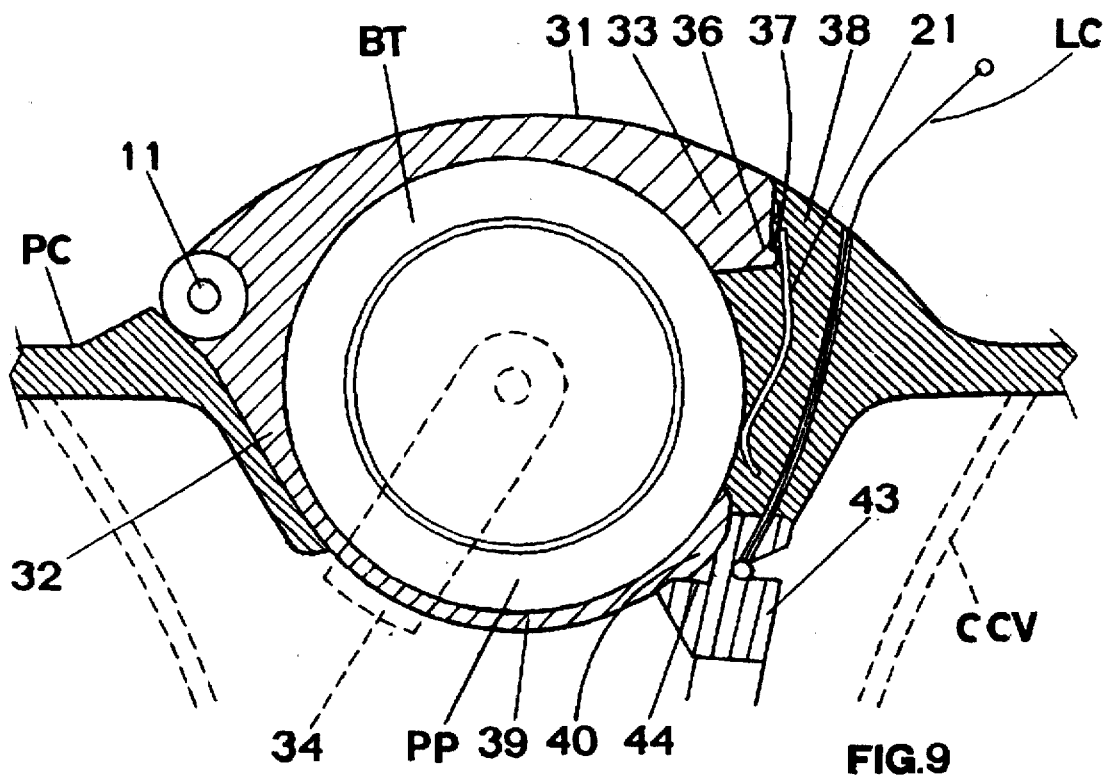
FIG. 9 is a section of another embodiment of the invention provided with a battery holder of the vertical battery kind, in the "ON" position.
Figure 9A:
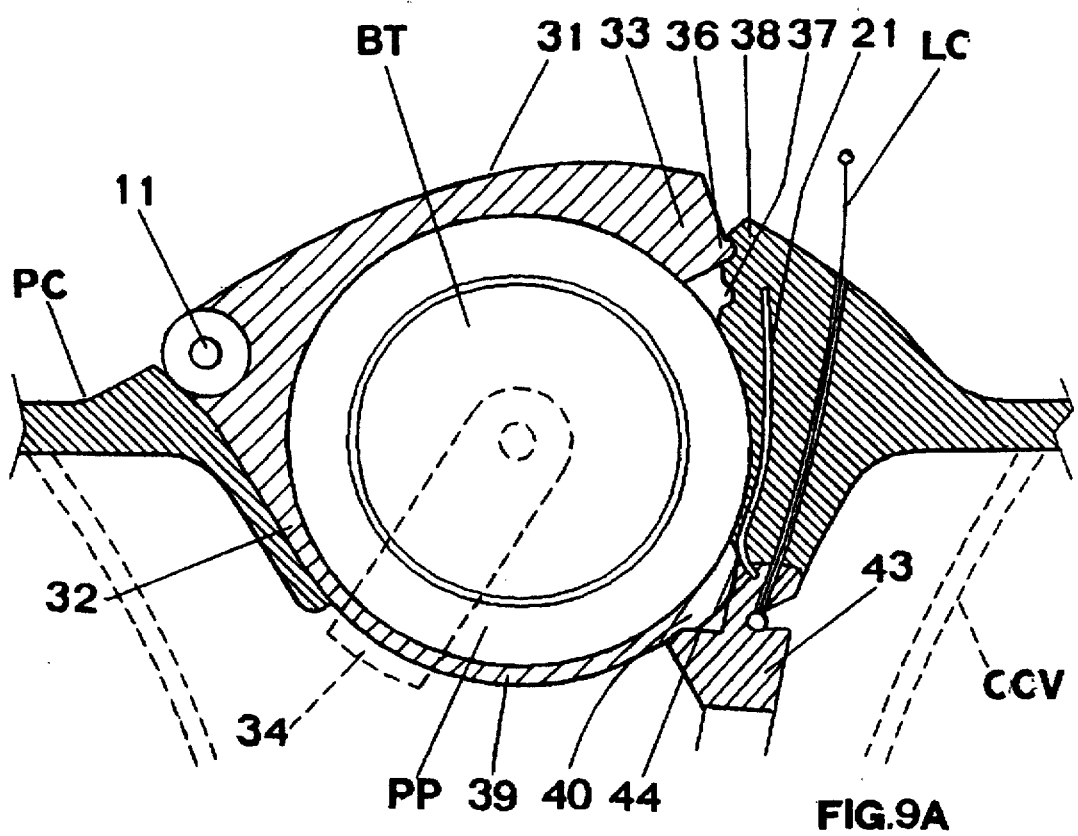
FIG. 9A is an identical section as the one in FIG. 9 with the battery holder in the "OFF" position.

The embodiment shown in FIGS. 9 and 9A is similar to the embodiment of FIGS. 7 and 7A, the only difference being that thong LC is fastened to sliding element 43 instead of the top of small battery holder cover CPB. Also in this embodiment, pulling on thong LC causes sliding element 43 to lift battery BT, and causes the extension of insulating material 40 to move between positive pole PP and plate 21, thereby cutting the power supply to the inner circuits of the apparatus and putting said apparatus in the OFF position shown in FIG. 9A.

It is understood that the embodiments of the invention illustrated and above described have been proposed merely for an exemplificative and absolutely not restrictive purpose.

Thus, having described the invention, what is claimed is:

1. An improved miniaturized hearing aid intended for a deep insertion into the auditory meatus of a person who suffers from hearing problems comprising:

a hollow body (CCV);

a closure plate (PC) for said body having a cavity (12) for housing a battery (BT) having two poles (PP and PN) to supply power to operative circuits of the hearing aid (TSI); and a closing cover (CPB) for said cavity (12) having locking means cooperating with matching means housed in said cavity (12) for locking the cavity (12) in the closed position, said closing cover being hinged so as to pivot and rotate toward and away from said cavity (12) and being shaped so as to house said battery (BT) so that said battery moves together with said cover (CPB), said miniaturized hearing aid (TSI) further having a removal thong (LC) with an inner end fastened thereto and having the free end (EST) in the pinna (PDG) of the ear (OCH) of said person, and first and second electrical contacts (16 and 34) for the two poles (PP and PN) of said battery (BT), each contact (16 and 34) being disposed in said cavity (12) so as to be in electrical contact with the respective battery pole when said cover (CPB) is in the closed position, the first of said contacts (16) biasing said battery (BT) upwardly so as to cause said cover (CPB) to open when said locking means are disengaged and cause said second contact (34) to detach from the respective pole of said battery (BT), so as to cut the power supply to said operative circuits and place the hearing aid (TSI) in the OFF position, the inner end (25) of said thong (LC) being fastened to the hearing aid (TSI) in such a way that pulling on said thong (LC) opens said cover (CPB) and switches off the hearing aid (TSI).

2. The miniaturized hearing aid of claim 1, wherein said inner end (25) of said thong (LC) is fastened to said cover (CPB).

3. The miniaturized hearing aid of claim 2 wherein said cover (CPB) holds said battery (BT) in a position essentially parallel to said closure plate (PC).

4. The miniaturized hearing aid of claim 3, wherein said cover (CPB) holds a permanent magnet (45), in the form of a plate fastened to its inner side, for holding the battery (BT) and preventing the accidental removal of the battery when the cover (CPB) is completely open.

5. The miniaturized hearing aid of claim 4 wherein said cover (CPB) is provided with an insulating material element (40) that, in the cover open position, is movable between one of the poles of said battery (BT) and the relative contact causing the interruption of the power supply to said operative circuits of said miniaturized hearing aid (TSI) thereby placing the hearing aid in the OFF position.

6. The miniaturized hearing aid of claim 2 wherein said cover (CPB) holds said battery (BT) essentially in a plane containing the longitudinal axis of said hollow body (CCV).

7. The miniaturized aid of claim 1, wherein said thong (LC) is movable inside a passage (26) formed in said closure plate (PC) and said thong inner end (25) is fastened to the second of said contacts, disposed under said battery (BT), so that pulling on said thong lifts the same contact biasing said battery (BT) upward to the cover open position and causes the disengagement of the means that maintains said cover (CPB) in the closed position, thereby opening the cover.

8. The miniaturized hearing aid of claim 7 wherein said cover (CPB) holds said battery (BT) in a position essentially parallel to said closure plate (PC).

9. The miniaturized hearing aid of claim 8, wherein said cover (CPB) holds a permanent magnet (45), in the form of a plate fastened to its inner side, for holding the battery (BT) and preventing the accidental removal of the battery when the cover (CPB) is completely open.

10. The miniaturized hearing aid of claim 9 wherein said cover (CPB) is provided with an insulating material element (40) that, in the cover open position, is movable between one of the poles of said battery (BT) and the relative contact causing the interruption of the power supply to said operative circuits of said miniaturized hearing aid (TSI) thereby placing the hearing aid in the OFF position.

11. The miniaturized hearing aid of claim 7 wherein said cover (CPB) holds said battery (BT) essentially in a plane containing the longitudinal axis of said hollow body (CCV).

12. The miniaturized hearing aid of claim 1, wherein the inner end of said thong (LC) is fastened to a sliding element (43) moving in said cavity (12), under said battery (BT), between a non-operative position and a position wherein said sliding element (43), pulled by said thong (LC), biases said battery (BT) towards the opening position of said small battery holder cover (CPB).

13. The miniaturized hearing aid of claim 12 wherein said cover (CPB) holds said battery (BT) in a position essentially parallel to said closure plate (PC).

14. The miniaturized hearing aid of claim 13, wherein said cover (CPB) holds a permanent magnet (45), in the form of a plate fastened to its inner side, for holding the battery (BT) and preventing the accidental removal of the battery when the cover (CPB) is completely open.

15. The miniaturized hearing aid of claim 14 wherein said cover (CPB) is provided with an insulating material element (40) that, in the cover open position, is movable between one of the poles of said battery (BT) and the relative contact causing the interruption of the power supply to said operative circuits of said miniaturized hearing aid (TSI) thereby placing the hearing aid in the OFF position.

16. The miniaturized hearing aid of claim 12 wherein said cover (CPB) holds said battery (BT) essentially in a plane containing the longitudinal axis of said hollow body (CCV).

17. The miniaturized hearing aid of claim 1 wherein said cover (CPB) holds said battery (BT) in a position essentially parallel to said closure plate (PC).

18. The miniaturized hearing aid of claim 17, wherein said cover (CPB) holds a permanent magnet (45), in the form of a plate fastened to its inner side, for holding the battery (BT) and preventing the accidental removal of the battery when the cover (CPB) is completely open.

19. The miniaturized hearing aid of claim 18 wherein said cover (CPB) is provided with an insulating material element (40) that, in the cover open position, is movable between one of the poles of said battery (BT) and the relative contact causing the interruption of the power supply to said operative circuits of said miniaturized hearing aid (TSI) thereby placing the hearing aid in the OFF position.

20. The miniaturized hearing aid of claim 1 wherein said cover (CPB) holds said battery (BT) essentially in a plane containing the longitudinal axis of said hollow body (CCV).

21. The hearing aid of claim 1 wherein said cover is closable by exertion of pressure on said cover (CPB) to push back said cover (CPB) into the closed position to switch said hearing aid (TSI) to the ON position while in said auditory meatus.

* * * * *